US009037376B2

(12) United States Patent
Ogawa

(10) Patent No.: US 9,037,376 B2
(45) Date of Patent: May 19, 2015

(54) ROAD-SURFACE CONDITION ESTIMATING DEVICE

(75) Inventor: Hiroshi Ogawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1946 days.

(21) Appl. No.: 12/137,588

(22) Filed: Jun. 12, 2008

(65) Prior Publication Data

US 2008/0319626 A1    Dec. 25, 2008

(30) Foreign Application Priority Data

Jun. 21, 2007 (JP) ................................. 2007-164083

(51) Int. Cl.
G06F 19/00 (2011.01)
B60T 8/172 (2006.01)

(52) U.S. Cl.
CPC ............. B60T 8/172 (2013.01); *B60T 2210/12* (2013.01)

(58) Field of Classification Search
USPC ................................................. 701/80; 73/9
See application file for complete search history.

(56) References Cited

U.S. PATENT DOCUMENTS

| 4,075,538 | A | * | 2/1978 | Plunkett | 318/52 |
|---|---|---|---|---|---|
| 4,947,332 | A | * | 8/1990 | Ghoneim | 701/84 |
| 6,324,461 | B1 | * | 11/2001 | Yamaguchi et al. | 701/80 |
| 6,473,682 | B1 | * | 10/2002 | Nakamura | 701/74 |
| 6,577,941 | B2 | * | 6/2003 | Kawasaki et al. | 701/70 |
| 6,601,435 | B2 | * | 8/2003 | Hong | 73/9 |
| 2005/0102086 | A1 | * | 5/2005 | Nakao | 701/80 |
| 2005/0234628 | A1 | * | 10/2005 | Luders et al. | 701/80 |
| 2007/0061061 | A1 | * | 3/2007 | Salman et al. | 701/80 |
| 2008/0021626 | A1 | * | 1/2008 | O'Dea et al. | 701/80 |

FOREIGN PATENT DOCUMENTS

JP         07-159308         6/1995

* cited by examiner

*Primary Examiner* — John Q Nguyen
*Assistant Examiner* — Kyung Kim
(74) *Attorney, Agent, or Firm* — Smith, Gambrell & Russell, LLP

(57) ABSTRACT

A front-wheel speed is calculated as a wheel speed of driving wheels, a rear-wheel speed is calculated as a wheel speed of driven wheels, a rear-wheel acceleration is calculated as a wheel acceleration of the driven wheels, a front-wheel-speed difference value is calculated as a driving-wheel-speed difference value, a rear-wheel-speed difference value is calculated as a driven-wheel-speed difference value, a rear-wheel-acceleration difference value is calculated as a driven-wheel-acceleration difference value, and a front-wheel ground load is calculated as a ground load acting on the driving wheels. Based on these calculated values, a gradient of a tire-characteristic curve indicating an amount of change in road-surface friction coefficient with respect to an amount of change in slip rate is calculated, and the calculated gradient of the tire-characteristic curve is compared with preset threshold values, whereby a road-surface friction coefficient as a road-surface condition can be determined.

10 Claims, 3 Drawing Sheets

ROAD-SURFACE CONDITION ESTIMATING DEVICE

CROSS REFERENCES TO RELATED APPLICATIONS

The disclosure of Japanese Patent Application No. 2007-164083 filed on Jun. 21, 2007 including the specification, drawings, and abstract is incorporated herein by reference in its entirety.

BACKGROUND OF THE INVENTION

1. Field of the Invention

The present invention relates to a road-surface condition estimating device that estimates a road-surface condition with high accuracy on the basis of a relationship between a road-surface friction coefficient and a slip rate of a vehicle wheel.

2. Description of the Related Art

In recent years, there have been proposed and put in practical use various control technologies for vehicles, such as traction control, braking-force control, and torque-distribution control technologies. These technologies generally utilize a road-surface friction coefficient, which indicates a road-surface condition, for the calculation or the correction of required control parameters. In order to perform the control properly, it is necessary to estimate a road-surface friction coefficient with high accuracy.

For example, Japanese Unexamined Patent Application Publication No. 7-159308 discloses a technology for estimating a road-surface friction coefficient. Specifically, the estimation is implemented by calculating a difference in speed between front and rear wheels, integrating the differences in speed sequentially at predetermined intervals to obtain an integrated value, calculating an average gradient of the integrated value within a predetermined time period, determining whether it is an appropriate time for estimating a road-surface friction coefficient from the calculated average gradient within the predetermined time period, and estimating a road-surface friction coefficient from the average gradient of the finely variable wheel speeds within the predetermined time period if the determination result shows that it is an appropriate time for the estimation of a road-surface friction coefficient.

In the technology disclosed in Japanese Unexamined Patent Application Publication No. 7-159308, the relationship between a road-surface friction coefficient $\mu$ and a slip rate $\lambda$ of the wheel is as shown in, for example, FIG. 4. Specifically, this technology utilizes the characteristic in which when the slip rate $\lambda$ becomes $\lambda s$ and an amount of change in road-surface friction coefficient with respect to an amount of change in slip rate ($d\mu/d\lambda$) becomes zero, a value of a road-surface friction coefficient $\mu$ in that state finally becomes the road-surface friction coefficient $\mu$. This implies that the value of the road-surface friction coefficient $\mu$ can only be estimated when the wheel is near the grip limit. Since the estimation of the road-surface friction coefficient $\mu$ is not possible in other running ranges being out of when the wheel is near the grip limit this technology is problematic in terms of low versatility. In most vehicle controls, it is necessary to ensure stability of the vehicle by properly controlling the vehicle behavior before the wheel reaches the grip limit, and therefore, it is difficult to apply the technology to such vehicle controls. Moreover, although the estimation of a road-surface friction coefficient $\mu$ in the Japanese Unexamined Patent Application Publication No. 7-159308 is implemented based on a theory that the product of the road-surface friction coefficient $\mu$ and the ground load of the wheel is equal to the total driving force, if the vehicle is on a sloped road, it is not possible to obtain a road-surface friction coefficient $\mu$ with high accuracy unless errors caused by the slope are taken into account.

SUMMARY OF THE INVENTION

In view of the circumstances described above, it is an object of the present invention to provide a road-surface condition estimating device in a vehicle that allows for an estimation of a road-surface condition over a wide running range, and that can estimate a road-surface condition with high accuracy even when the vehicle is running on a sloped road surface.

A first aspect of the present invention provides a road-surface condition estimating device, the road-surface condition estimating device including driving-wheel-speed detecting means that detects a speed of a driving wheel; driven-wheel-speed detecting means that detects a speed of a driven wheel; driven-wheel-acceleration detecting means that detects an acceleration of the driven wheel; driving-wheel-speed difference calculating means that calculates a difference between a currently detected driving wheel speed and a previously detected driving wheel speed as a driving-wheel-speed difference; driven-wheel-speed difference calculating means that calculates a difference between a currently detected driven wheel speed and a previously detected driven wheel speed as a driven-wheel-speed difference; acceleration difference calculating means that calculates a difference between a currently detected driven-wheel acceleration and a previously detected driven-wheel acceleration as a driven-wheel-acceleration difference; ground-load calculating means that calculates a ground load acting on the driving wheel; characteristic calculating means that calculates an amount of change in a road-surface friction coefficient with respect to an amount of change in a slip rate in a characteristic curve that indicates a relationship between the road-surface friction coefficient and the slip rate, the calculation being performed on the basis of the driving wheel speed, the driven wheel speed, the driving-wheel-speed difference, the driven-wheel-speed difference, the driven-wheel-acceleration difference, and the ground load; and road-surface-condition determining means that determines a road-surface condition on the basis of the amount of change in the road-surface friction coefficient.

A second aspect of the present invention according to the first aspect is that the characteristic calculating means calculates the amount of change in the road-surface friction coefficient on the basis of a value divided a difference of a driving force by a product of the amount of change in the slip rate and the driving-wheel ground load.

A third aspect of the present invention according to the first aspect is that the road-surface-condition determining means compares a preset threshold with the amount of change in the road-surface friction coefficient so as to estimate a road-surface friction coefficient.

The road-surface condition estimating device according to the present inventions allows for an estimation of a road-surface condition over a wide running range, and can estimate a road-surface condition with high accuracy even when the vehicle is running on a sloped road surface.

DESCRIPTION OF THE PREFERRED EMBODIMENTS

Embodiments of the present invention will now be described with reference to the drawings.

The present embodiment is directed to a two-wheel drive vehicle such as a front-engine front-drive type (namely, a vehicle in which the front wheels serve as driving wheels and the rear wheels serve as driven wheels) as an example of a vehicle equipped with the road-surface condition estimating device. The various parameters to be used in the equations below are those shown in FIG. 3.

Figure 1:
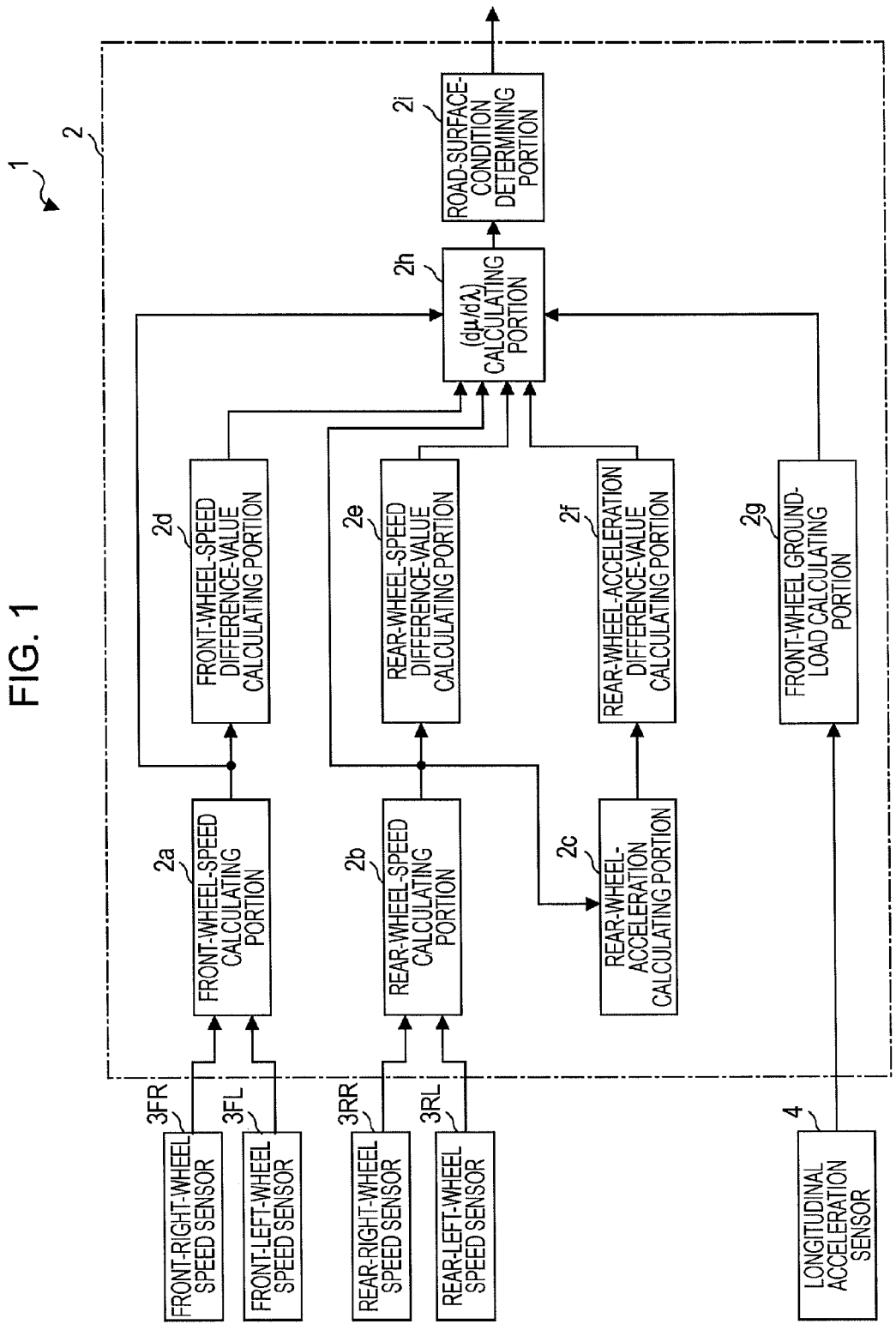
FIG. 1 is a functional block diagram of a road-surface condition estimating device.

Referring to FIG. 1, reference numeral 1 denotes a road-surface condition estimating device which is equipped in a vehicle and estimates a road-surface condition. The road-surface condition estimating device 1 has a control unit 2 connected to a front-left-wheel speed sensor 3FL that detects a wheel speed $\omega FL$ of the front left wheel serving as a driving wheel, to a front-right-wheel speed sensor 3FR that detects a wheel speed $\omega FR$ of the front right wheel also serving as a driving wheel, to a rear-left-wheel speed sensor 3RL that detects a wheel speed $\omega RL$ of the rear left wheel serving as a driven wheel, to a rear-right-wheel speed sensor 3RR that detects a wheel speed $\omega RR$ of the rear right wheel also serving as a driven wheel, and to a longitudinal acceleration sensor 4 that detects a longitudinal acceleration Ax of the vehicle.

The control unit 2 of the road-surface condition estimating device 1 receives signals indicating the wheel speeds $\omega FL$, $\omega FR$, $\omega RL$, and $\omega RR$ and the longitudinal acceleration Ax from these sensors and executes a road-surface estimating program to be described below based on these input signals so as to estimate and output a road-surface condition (a road-surface friction coefficient $\mu$ in this embodiment). Specifically, as shown in FIG. 1, the control unit 2 mainly includes a front-wheel-speed calculating portion 2a, a rear-wheel-speed calculating portion 2b, a rear-wheel-acceleration calculating portion 2c, a front-wheel-speed difference-value calculating portion 2d, a rear-wheel-speed difference-value calculating portion 2e, a rear-wheel-acceleration difference-value calculating portion 2f, a front-wheel ground-load calculating portion 2g, a ($d\mu/d\lambda$) calculating portion 2h, and a road-surface-condition determining portion 2i.

The front-wheel-speed calculating portion 2a receives the wheel speeds $\omega FL$ and $\omega FR$ of the front left and right wheels from the front-left-wheel and front-right-wheel speed sensors 3FL and 3FR, calculates a front-wheel speed $\omega F$ as a wheel speed of the driving wheels from the following equation (1), and then outputs the calculated front-wheel speed $\omega F$ to the front-wheel-speed difference-value calculating portion 2d and the ($d\mu/d\lambda$) calculating portion 2h. In other words, the front-wheel-speed calculating portion 2a serves as driving-wheel-speed detecting means. An additional character (n) given after each symbol indicates that the value is of a current state, whereas an additional character (n-1) given after a symbol indicates that the value is of a previous state (for example, a value corresponding to one previous sample).

$$\omega F(n)=(\omega FL(n)+\omega FR(n))/2 \tag{1}$$

The rear-wheel-speed calculating portion 2b receives the wheel speeds $\omega RL$ and $\omega RR$ of the rear left and right wheels from the rear-left-wheel and rear-right-wheel speed sensors 3RL and 3RR, calculates a rear-wheel speed $\omega R$ as a wheel speed of the driven wheels from the following equation (2), and then outputs the calculated rear-wheel speed $\omega R$ to the rear-wheel-acceleration calculating portion 2c, the rear-wheel-speed difference-value calculating portion 2e, and the ($d\mu/d\lambda$) calculating portion 2h. In other words, the rear-wheel-speed calculating portion 2b serves as driven-wheel-speed detecting means.

$$\omega R(n)=(\omega RL(n)+\omega RR(n))/2 \tag{2}$$

The rear-wheel-acceleration calculating portion 2c receives the rear-wheel speed $\omega R$ from the rear-wheel-speed calculating portion 2b, calculates a rear-wheel acceleration ($d\omega R/dt$) as a wheel acceleration of the driven wheels from the following equation (3), and outputs the calculated rear-wheel acceleration ($d\omega R/dt$) to the rear-wheel-acceleration difference-value calculating portion 2f. In other words, the rear-wheel-acceleration calculating portion 2c serves as driven-wheel-acceleration detecting means.

$$(d\omega R/dt)(n)=(\omega R(n)-\omega R(n-1))/\Delta t \tag{3}$$

In this case, $\Delta t$ indicates a sampling time.

The front-wheel-speed difference-value calculating portion 2d receives the front-wheel speed $\omega F$ from the front-wheel-speed calculating portion 2a, calculates a front-wheel-speed difference value $\Delta\omega F$ as a driving-wheel-speed difference value from the following equation (4), and outputs the calculated front-wheel-speed difference value $\Delta\omega F$ to the ($d\mu/d\lambda$) calculating portion 2h. In other words, the front-wheel-speed difference-value calculating portion 2d serves as driving-wheel-speed difference-value calculating means.

$$\Delta\omega F(n)=\omega F(n)-\omega F(n-1) \tag{4}$$

The rear-wheel-speed difference-value calculating portion 2e receives the rear-wheel speed $\omega R$ from the rear-wheel-speed calculating portion 2b, calculates a rear-wheel-speed difference value $\Delta\omega R$ as a driven-wheel-speed difference value from the following equation (5), and outputs the calculated rear-wheel-speed difference value $\Delta\omega R$ to the ($d\mu/d\lambda$) calculating portion 2h. In other words, the rear-wheel-speed difference-value calculating portion 2e serves as driven-wheel-speed difference-value calculating means.

$$\Delta\omega R(n)=\omega R(n)-\omega R(n-1) \tag{5}$$

The rear-wheel-acceleration difference-value calculating portion 2f receives the rear-wheel acceleration ($d\omega R/dt$) from the rear-wheel-acceleration calculating portion 2c, calculates a rear-wheel-acceleration difference value $\Delta(d\omega R/dt)$ as a driven-wheel-acceleration difference value from the following equation (6), and outputs the calculated rear-wheel-acceleration difference value $\Delta(d\omega R/dt)$ to the ($d\mu/d\lambda$) calculating portion 2h. In other words, the rear-wheel-acceleration difference-value calculating portion 2f serves as acceleration difference-value calculating means.

$$\Delta(d\omega R/dt)(n)=(d\omega R/dt)(n)-(d\omega R/dt)(n-1) \tag{6}$$

The front-wheel ground-load calculating portion 2g receives the longitudinal acceleration Ax of the vehicle from the longitudinal acceleration sensor 4, calculates a front-wheel ground load $F_{zf}$ as a ground load acting on the driving wheels from, for example, the following equation (7), and outputs the calculated front-wheel ground load $F_{zf}$ to the ($d\mu/d\lambda$) calculating portion 2h. In other words, the front-wheel ground-load calculating portion 2g serves as ground-load calculating means.

$$F_{zf}=m \cdot g \sim((L_r/L)-(H/L)) \cdot Ax \quad (7)$$

In this case, m indicates a vehicle mass, g indicates a gravitational acceleration, L indicates a wheel base, $L_r$ indicates the distance between the center of gravity and the rear axle, and H indicates the height of the center of gravity.

In the case of a vehicle with small fluctuation in the front-wheel ground load $F_{zf}$, a preliminarily determined constant may be used as the front-wheel ground load $F_{zf}$. The longitudinal acceleration Ax of the vehicle may alternatively be calculated from the following equation (8) instead of being a detection value obtained from the longitudinal acceleration sensor 4.

$$Ax=((T \cdot i/R)-F_r)/m \quad (8)$$

In this case, T indicates an engine torque, i indicates a transmission gear ratio, R indicates a tire radius, and $F_r$ indicates a running resistance.

The $(d\mu/d\lambda)$ calculating portion 2h receives the front-wheel speed $\omega F$ from the front-wheel-speed calculating portion 2a, the rear-wheel speed $\omega R$ from the rear-wheel-speed calculating portion 2b, the front-wheel-speed difference value $\Delta \omega F$ from the front-wheel-speed difference-value calculating portion 2d, the rear-wheel-speed difference value $\Delta \omega R$ from the rear-wheel-speed difference-value calculating portion 2e, the rear-wheel-acceleration difference value $\Delta(d\omega R/dt)$ from the rear-wheel-acceleration difference-value calculating portion 2f, and the front-wheel ground load $F_{zf}$ from the front-wheel ground-load calculating portion 2g. The $(d\mu/d\lambda)$ calculating portion 2h then calculates a gradient $(d\mu/d\lambda)$ of a tire-characteristic curve from the following equation (9) and outputs the calculated gradient $(d\mu/d\lambda)$ to the road-surface-condition determining portion 2i. Specifically, a gradient $(d\mu/d\lambda)$ of a tire-characteristic curve indicates an amount of change in road-surface friction coefficient with respect to an amount of change in slip rate. In other words, the $(d\mu/d\lambda)$ calculating portion 2h serves as characteristic calculating means.

$$(d\mu/d\lambda)=((m \cdot R+(I_r/R)) \cdot \Delta(d\omega R/dt))/((Fzf/\omega F) \cdot (\omega R/\omega F) \cdot \Delta \omega F - \Delta \omega R)) \quad (9)$$

In this case, $I_r$ indicates total inertia of the two rear wheels serving as the driven wheels.

The derivation of the equation (9) will be described below.

Figure 3:
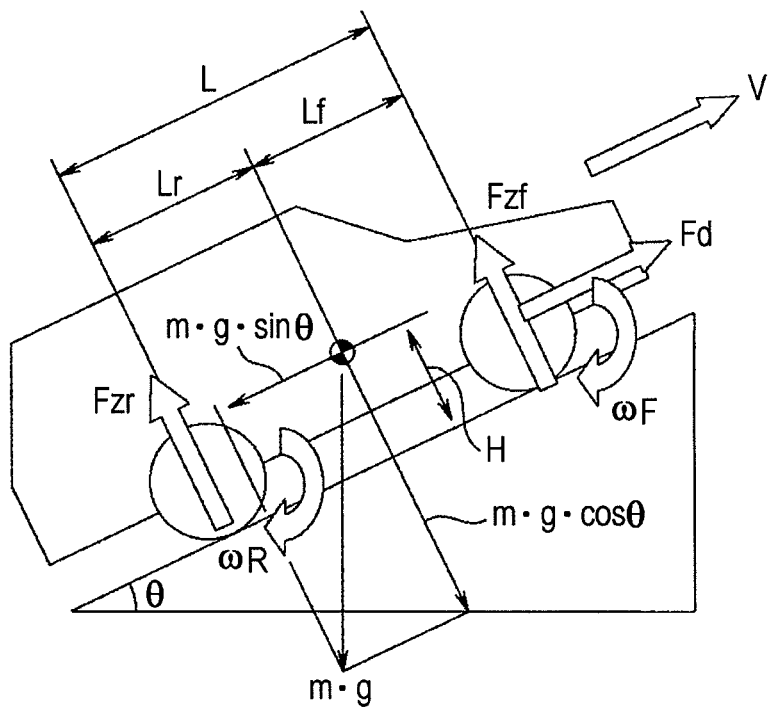
FIG. 3 is a diagram illustrating various parameters in a vehicle model.

If the driving force acting in the traveling direction of the vehicle in FIG. 3 is expressed as Fd, the following equation (10) holds:

$$R \cdot Fd=(R \cdot (d\omega R/dt)+g\sim\sin(\theta))\sim m \cdot R+(d\omega R/dt) \cdot I_r \quad (10)$$

In this case, $\theta$ indicates the slope angle of the road.

By calculating differences between values of the current state and values of a previous state (such as values of one previous state) with respect to the equation (10) and expressing the differences with an addition of $\Delta$, the following equation (11) can be obtained:

$$R \cdot \Delta Fd=\Delta(d\omega R/dt) \cdot m \cdot R^2+\Delta(d\omega R/dt) \cdot I_r \quad (11)$$

In the course of the derivation of the equation (11), the term $g \cdot \sin(\theta)$ that appears in accordance with an ascending/descending slope is removed as a constant term when the differences ($\Delta Fd$) are calculated.

When the relationship between a slip rate $\lambda$ and a road-surface friction coefficient $\mu$ (see FIG. 4) is expressed as a function $\mu(\lambda)$, the tire characteristics of the driving wheels can be expressed by the following equation (12) using the front-wheel ground load $F_{zf}$ as a ground load acting on the driving wheels.

$$Fd=F_{zf} \cdot \mu(\lambda) \quad (12)$$

By similarly calculating differences between values of the current state and values of a previous state (such as values of one previous state) with respect to the equation (12) and expressing the differences with an addition of $\Delta$, the following equation (13) can be obtained. It is to be noted however that a time change $\Delta F_{zf}$ in the front-wheel ground load $F_{zf}$ occurring due to a change in the angle of the ascending/descending slope or a change in the acceleration is ignored in the equation (13). Since the time change $\Delta F_{zf}$ becomes zero under a running condition where the angle of the ascending/descending slope or the acceleration is fixed, ignoring this term $\Delta F_{zf}$ rarely leads to a problem.

$$\Delta Fd=F_{zf} \cdot (d\mu/d\lambda) \cdot \Delta \lambda + \mu(\lambda) \cdot \Delta F_{zf} \approx F_{zf} \cdot (d\mu/d\lambda) \cdot \Delta \lambda \quad (13)$$

Due to the fact that the front wheels serve as driving wheels and the rear wheels serve as driven wheels, the slip rate $\lambda$ is defined by the following equation (14). By similarly calculating differences between values of the current state and values of a previous state (such as values of one previous state) with respect to the equation (14) and expressing the differences with an addition of $\Delta$, the following equation (15) can be obtained.

$$\lambda=(\omega F-\omega R)/\omega F \quad (14)$$

$$\Delta \lambda=(1/\omega F) \cdot ((\omega R/\omega F) \cdot \Delta \omega F - \Delta \omega R) \quad (15)$$

Generally, since an actual slip rate $\lambda$ of a tire is difficult to measure and is an amount having two degrees of freedom derived from the calculation of two input wheel speeds, it is difficult to make a selection of an appropriate filter. In contrast, with the aforementioned equation (15), the wheel speeds can be readily measured with high accuracy, thereby facilitating the selection of a filter having both noise reduction and good response features.

By substituting the equation (11) and the equation (15) into the equation (13) to obtain a simplified expression for $(d\mu/d\lambda)$ (i.e. $(d\mu/d\lambda)=\Delta Fd/(F_{zf} \sim \Delta \lambda)$), the aforementioned equation (9) can be obtained. Using this equation (9), it is also possible to directly calculate the gradient $(d\mu/d\lambda)$ by, for example, determining a difference value $\Delta \lambda$ of the slip rate $\lambda$ from the equation (15) and a difference value $\Delta Fd$ of the driving force Fd from engine torque information. This method may be suitable for a vehicle with a direct injection engine or a diesel engine in which engine torque can be estimated with high accuracy. This is because such a vehicle does not require acceleration information of the driven wheels and is less affected by disturbance, and can therefore allow for a stable estimation.

Although it is possible to determine a gradient $(d\mu/d\lambda)$ by implementing a calculation using the aforementioned equation (9) for every sampling time, a recursive least square method or a parameter identification method such as a fixed trace method can be applied since these methods are widely known as methods for estimating a gradient $(d\mu/d\lambda)$ from time-series data. Alternatively, another method may be applied, which includes implementing a linear regression calculation from a current value up to a value previous to the current value by p, statistically determining a gradient $(d\mu/d\lambda)$ and the reciprocal of the gradient $(d\mu/d\lambda)$, and evaluating a correlation coefficient to be used for determination of a renewal of an estimation value.

From the $(d\mu/d\lambda)$ calculating portion 2h, the road-surface-condition determining portion 2i receives the gradient $(d\mu/$ dλ) of the tire-characteristic curve indicating the amount of change in road-surface friction coefficient with respect to the amount of change in slip rate. Subsequently, for example, the road-surface-condition determining portion $2i$ compares the gradient $(d\mu/d\lambda)$ of the tire-characteristic curve with preset threshold values $K_{CH}$ and $K_{CL}$ ($K_{CH} > K_{CL}$) as shown below so as to estimate and output a road-surface friction coefficient μ as a road-surface condition. In other words, the road-surface-condition determining portion $2i$ serves as road-surface-condition determining means.

When $(d\mu/d\lambda) \geq K_{CH}$, the road surface is determined to be a high μ road.

When $K_{CH} > (d\mu/d\lambda) \geq K_{CL}$, the road surface is determined to be a medium μ road.

When $(d\mu/d\lambda) \leq K_{CL}$, the road surface is determined to be a low μ road.

Figure 4:
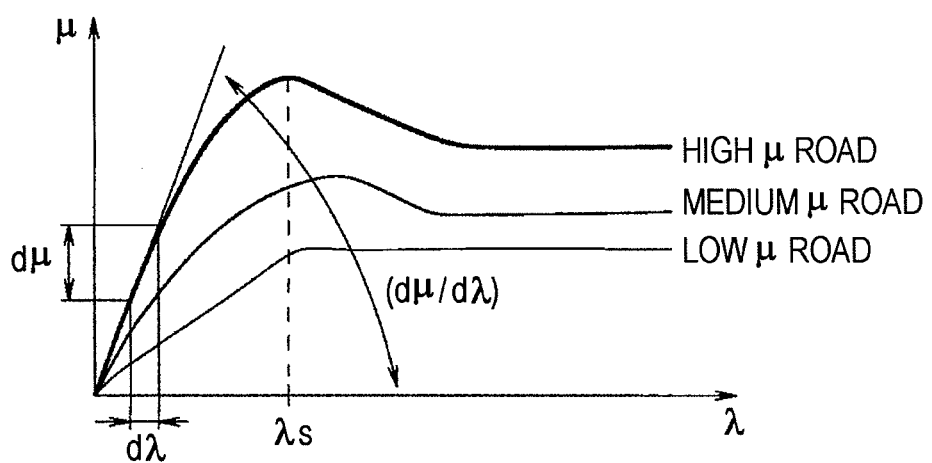
FIG. 4 is a diagram showing characteristic curves corresponding to road-surface friction coefficient versus slip rate relationships.

Specifically, according to the characteristic curves as in FIG. 4 showing the relationships between the road-surface friction coefficient μ and the slip rate λ, it is generally known that a gradient $(d\mu/d\lambda)$ of a tire-characteristic curve is greater when the vehicle is on a high μ road and is smaller when the vehicle is on a low μ road. By utilizing these characteristic differences, a road-surface friction coefficient μ can be estimated.

In the present embodiment, the determination of a road-surface friction coefficient μ is implemented based on three stages by comparing the preset threshold values $K_{CH}$ and $K_{CL}$ with the gradient $(d\mu/d\lambda)$. Alternatively, the determination of a road-surface friction coefficient μ may be implemented based on two stages by setting only one threshold value. As a further alternative, the determination of a road-surface friction coefficient μ may be implemented more finely based on a larger number of stages by setting more threshold values and comparing the gradient $(d\mu/d\lambda)$ with these threshold values.

A road-surface condition (road-surface friction coefficient μ) determined by the road-surface-condition determining portion $2i$ in the above-described manner is output to, for example, an external display device (not shown) and is displayed at an instrument panel so that the driver can be informed of the condition. Alternatively, the road-surface condition may be output to an engine control unit, a transmission control unit, a driving-force distribution control unit, a brake control unit, etc. (none of which are shown) so as to be used as a basis for setting the control amounts in these control units.

Figure 2:
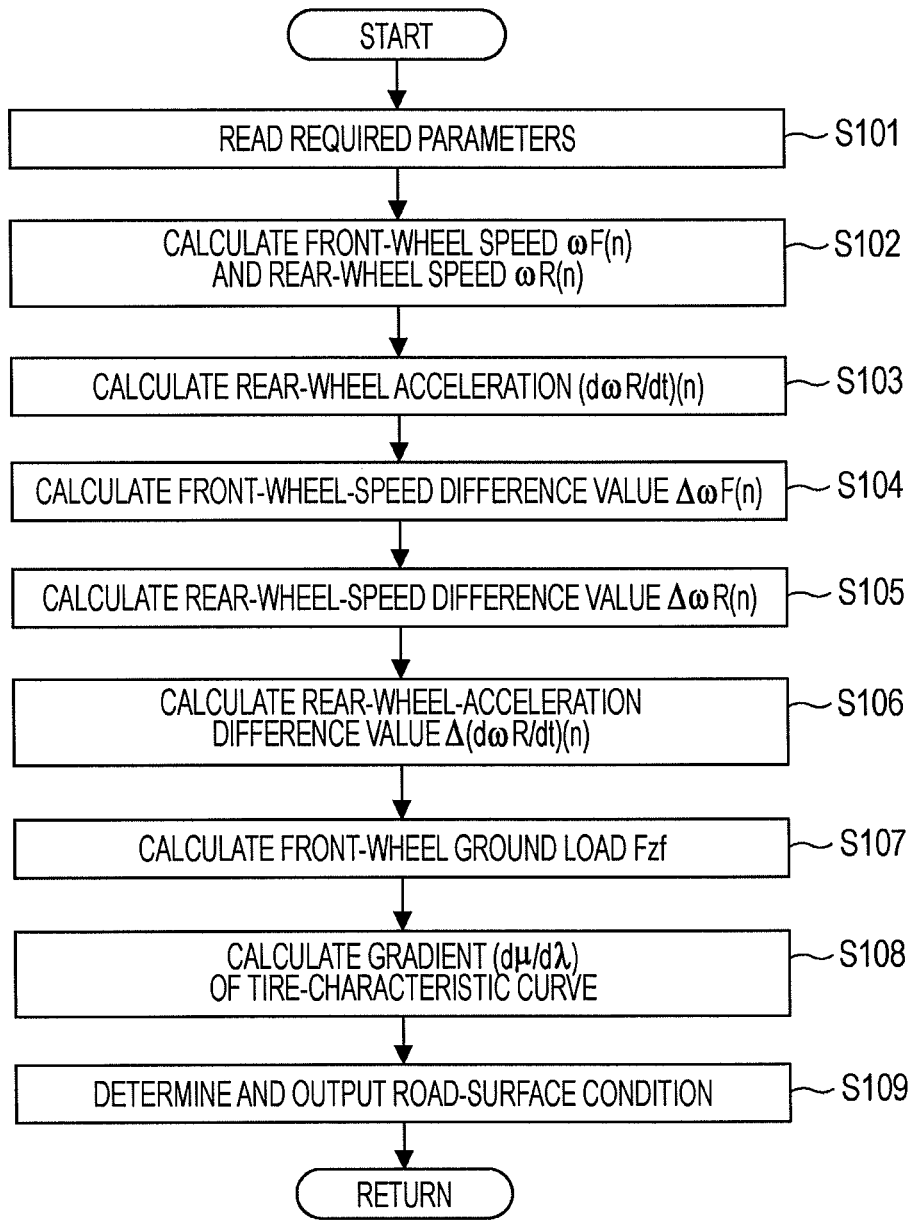
FIG. 2 is a flow chart of a road-surface condition estimating program.

The road-surface estimating program executed by the control unit 2 of the road-surface condition estimating device 1 will now be described with reference to the flow chart in FIG. 2.

First, in step S101, required parameters are read, which include wheel speeds ωFL and ωFR of the front left and right wheels, wheel speeds ωRL and ωRR of the rear left and right wheels, and a longitudinal acceleration Ax of the vehicle.

In step S102, the front-wheel-speed calculating portion $2a$ calculates a front-wheel speed ωF(n) from the aforementioned equation (1), and the rear-wheel-speed calculating portion $2b$ calculates a rear-wheel speed ωR(n) from the aforementioned equation (2).

In step S103, the rear-wheel-acceleration calculating portion $2c$ calculates a rear-wheel acceleration (dωR/dt)(n) from the aforementioned equation (3).

In step S104, the front-wheel-speed difference-value calculating portion $2d$ calculates a front-wheel-speed difference value ΔωF(n) from the aforementioned equation (4).

In step S105, the rear-wheel-speed difference-value calculating portion $2e$ calculates a rear-wheel-speed difference value ΔωR(n) from the aforementioned equation (5).

In step S106, the rear-wheel-acceleration difference-value calculating portion $2f$ calculates a rear-wheel-acceleration difference value Δ(dωR/dt)(n) from the aforementioned equation (6).

In step S107, the front-wheel ground-load calculating portion $2g$ calculates a front-wheel ground load $F_{zf}$ from, for example, the aforementioned equation (7).

In step S108, the $(d\mu/d\lambda)$ calculating portion $2h$ calculates a gradient $(d\mu/d\lambda)$ of a tire-characteristic curve from the aforementioned equation (9).

In step S109, the road-surface-condition determining portion $2i$ compares the gradient $(d\mu/d\lambda)$ of the tire-characteristic curve with preset threshold values $K_{CH}$ and $K_{CL}$ ($K_{CH} > K_{CL}$) so as to determine whether a road-surface friction coefficient μ as a road-surface condition corresponds to a high μ road, a medium μ road, or a low μ road. The road-surface-condition determining portion $2i$ subsequently outputs the determination result, whereby the program ends.

According to the embodiment of the present invention, a front-wheel speed ωF is calculated as a wheel speed of the driving wheels, a rear-wheel speed ωR is calculated as a wheel speed of the driven wheels, a rear-wheel acceleration (dωR/dt) is calculated as a driven-wheel acceleration, a front-wheel-speed difference value ΔωF is calculated as a driving-wheel-speed difference value, a rear-wheel-speed difference value ΔωR is calculated as a driven-wheel-speed difference value, a rear-wheel-acceleration difference value Δ(dωR/dt) is calculated as a driven-wheel-acceleration difference value, and a front-wheel ground load $F_{zf}$ is calculated as a ground load acting on the driving wheels. Based on these calculated values, a gradient $(d\mu/d\lambda)$ of a tire-characteristic curve indicating an amount of change in road-surface friction coefficient with respect to an amount of change in slip rate is calculated, and the calculated gradient $(d\mu/d\lambda)$ of the tire-characteristic curve is compared with preset threshold values $K_{CH}$ and $K_{CL}$ ($K_{CH} > K_{CL}$), whereby a road-surface friction coefficient μ as a road-surface condition can be determined. This allows for an estimation of a road-surface condition not only at the grip limit of the tires but also over a wide running range. Even when the vehicle is running on a sloped road surface, the road-surface condition can be estimated with high accuracy without including errors caused by the slope. In addition, since the road-surface-condition estimation is implemented in view of the effect of the ground load, the road-surface condition can be estimated with high accuracy. Moreover, because the road-surface condition is estimated simply by performing minimum calculation processes based on detection values of wheel speeds, a response delay caused by, for example, a filter can be reduced, thereby allowing for a road-surface-condition estimation with good response.

Although the present embodiment is directed to a two-wheel drive vehicle of a front-engine front-drive type as an example, the embodiment can be similarly applied to a two-wheel drive vehicle of a front-engine rear-drive type. In that case, the relationship between the driving wheels and the driven wheels becomes inverted relative to the relationship described above. Thus, the following equation (16) corresponding to the aforementioned equation (9) is used.

$$(d\mu/d\lambda) = ((m \cdot R + (I_f/R)) \cdot \Delta(d\omega F/dt))/((F_{zr}/\omega R) \cdot ((\omega F/\omega R) \cdot \Delta\omega R - \Delta\omega F)) \quad (16)$$

In this case, Δ(dωF/dt) indicates a front-wheel-acceleration difference value as a driven-wheel-acceleration difference value, $F_{zr}$ indicates a rear-wheel ground load as a ground load acting on the driving wheels, and $I_f$ indicates total inertia of the two front wheels serving as the driven wheels.

Although a road-surface condition is estimated with respect to the entire vehicle in the present embodiment, an alternative embodiment where road-surface conditions are estimated individually with respect to the left side and the right side of a vehicle is also permissible. With such an alternative embodiment, a so-called split μ road where the road-surface condition differs between the left and right sides of the vehicle can be detected with good response.

Although the present embodiment is directed to a two-wheel drive vehicle as an example, the road-surface-condition estimation according to the present embodiment can be similarly implemented in the case of a four-wheel drive vehicle having an adjustable torque distribution ratio feature where a driving force is controlled so as to be entirely applied to one pair of wheels (e.g. the front wheels).

What is claimed is:

1. A road-surface condition estimating device comprising:
   driving-wheel-speed detecting means that detects a speed of a driving wheel;
   driven-wheel-speed detecting means that detects a speed of a driven wheel;
   driven-wheel-acceleration detecting means that detects an acceleration of the driven wheel;
   driving-wheel-speed difference calculating means that calculates a difference between a currently detected driving wheel speed and a previously detected driving wheel speed as a driving-wheel-speed difference;
   driven-wheel-speed difference calculating means that calculates a difference between a currently detected driven wheel speed and a previously detected driven wheel speed as a driven-wheel-speed difference;
   acceleration difference calculating means that calculates a difference between a currently detected driven-wheel acceleration and a previously detected driven-wheel acceleration as a driven-wheel-acceleration difference;
   ground-load calculating means that calculates a ground load acting on the driving wheel;
   characteristic calculating means that calculates an amount of change in a road-surface friction coefficient with respect to an amount of change in a slip rate in a characteristic curve that indicates a relationship between the road-surface friction coefficient and the slip rate, the calculation being performed on the basis of the driving wheel speed, the driven wheel speed, the driving-wheel-speed difference value, the driven-wheel-speed difference value, the driven-wheel-acceleration difference, and the ground load; and
   road-surface-condition determining means that determines a road-surface condition on the basis of the amount of change in the road-surface friction coefficient.

2. The road-surface condition estimating device according to claim 1, wherein the characteristic calculating means calculates the amount of change in the road-surface friction coefficient on the basis of a difference of a driving force divided by a product of the amount of change in the slip rate and the driving-wheel ground load.

3. The road-surface condition estimating device according to claim 1, wherein the road-surface-condition determining means compares a preset threshold value with the amount of change in the road-surface friction coefficient so as to estimate a road-surface friction coefficient.

4. The road-surface condition estimating device according to claim 2, wherein the road-surface-condition determining means compares a preset threshold value with the amount of change in the road-surface friction coefficient so as to estimate a road-surface friction coefficient.

5. The road-surface condition estimating device according to claim 1, wherein the device is installed in a two-wheel drive vehicle in which front wheels are the driving wheels, and rear wheels are the driven wheels.

6. The road-surface condition estimating device according to claim 1, wherein the device is installed in a two-wheel drive vehicle in which rear wheels are the driving wheels, and front wheels are the driven wheels.

7. The road-surface condition estimating device according to claim 1, wherein the device is installed in a four-wheel drive vehicle having an adjustable torque distribution ratio system for, selectively: applying the driving force entirely to front wheels as the driving wheels; or applying the driving force entirely to rear wheels as the driving wheels.

8. The road-surface condition estimating device according to claim 2, wherein the device is installed in a two-wheel drive vehicle in which front wheels are the driving wheels, and rear wheels are the driven wheels.

9. The road-surface condition estimating device according to claim 2, wherein the device is installed in a two-wheel drive vehicle in which rear wheels are the driving wheels, and front wheels are the driven wheels.

10. The road-surface condition estimating device according to claim 2, wherein the device is installed in a four-wheel drive vehicle having an adjustable torque distribution ratio system for, selectively: applying the driving force entirely to front wheels as the driving wheels; or applying the driving force entirely to rear wheels as the driving wheels.

* * * * *